Oct. 6, 1953 G. TODD 2,654,462
CONVEYER DRIVE MECHANISM
Filed May 28, 1949 10 Sheets-Sheet 1
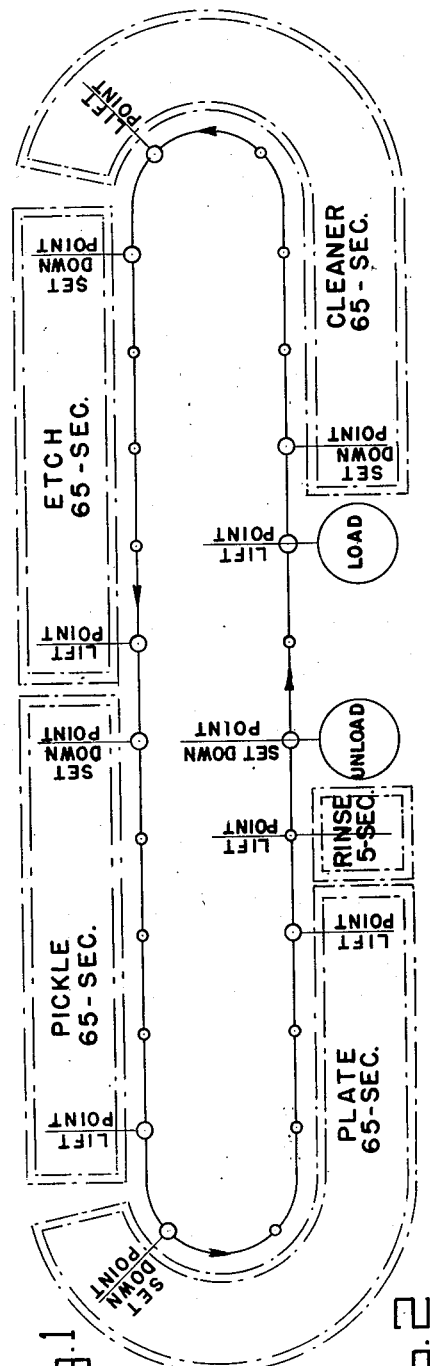
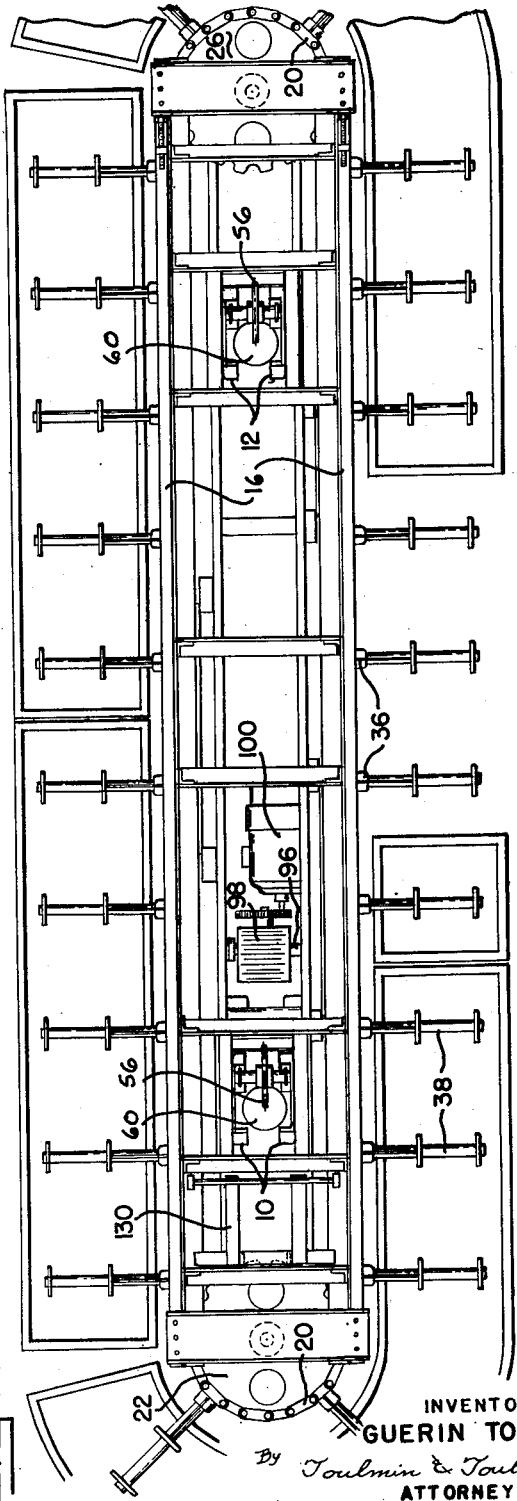
INVENTOR
GUERIN TODD
By Toulmin & Toulmin
ATTORNEY'S Oct. 6, 1953          G. TODD          2,654,462
CONVEYER DRIVE MECHANISM
Filed May 28, 1949          10 Sheets-Sheet 2
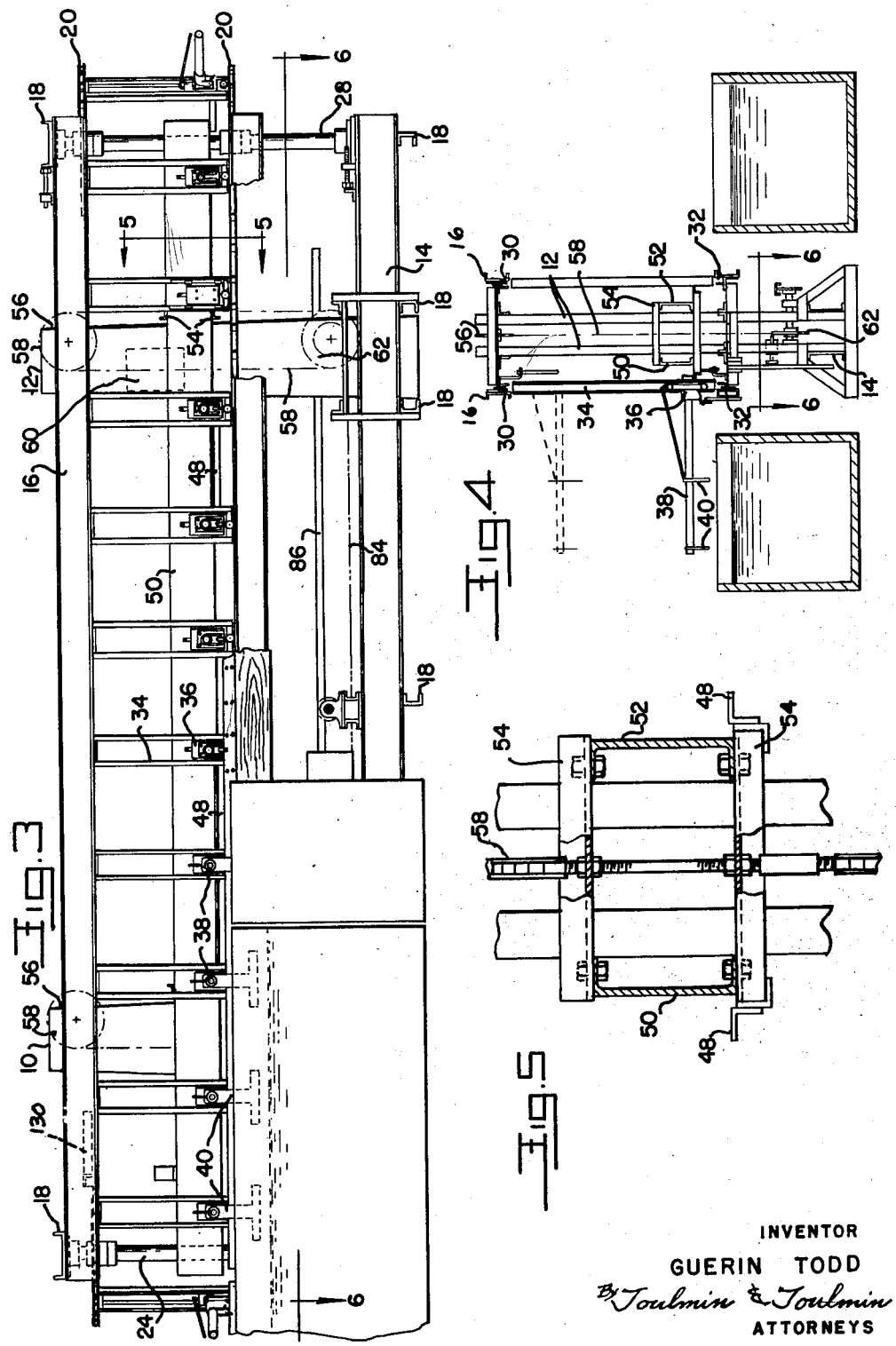
INVENTOR
GUERIN TODD
By Toulmin & Toulmin
ATTORNEYS

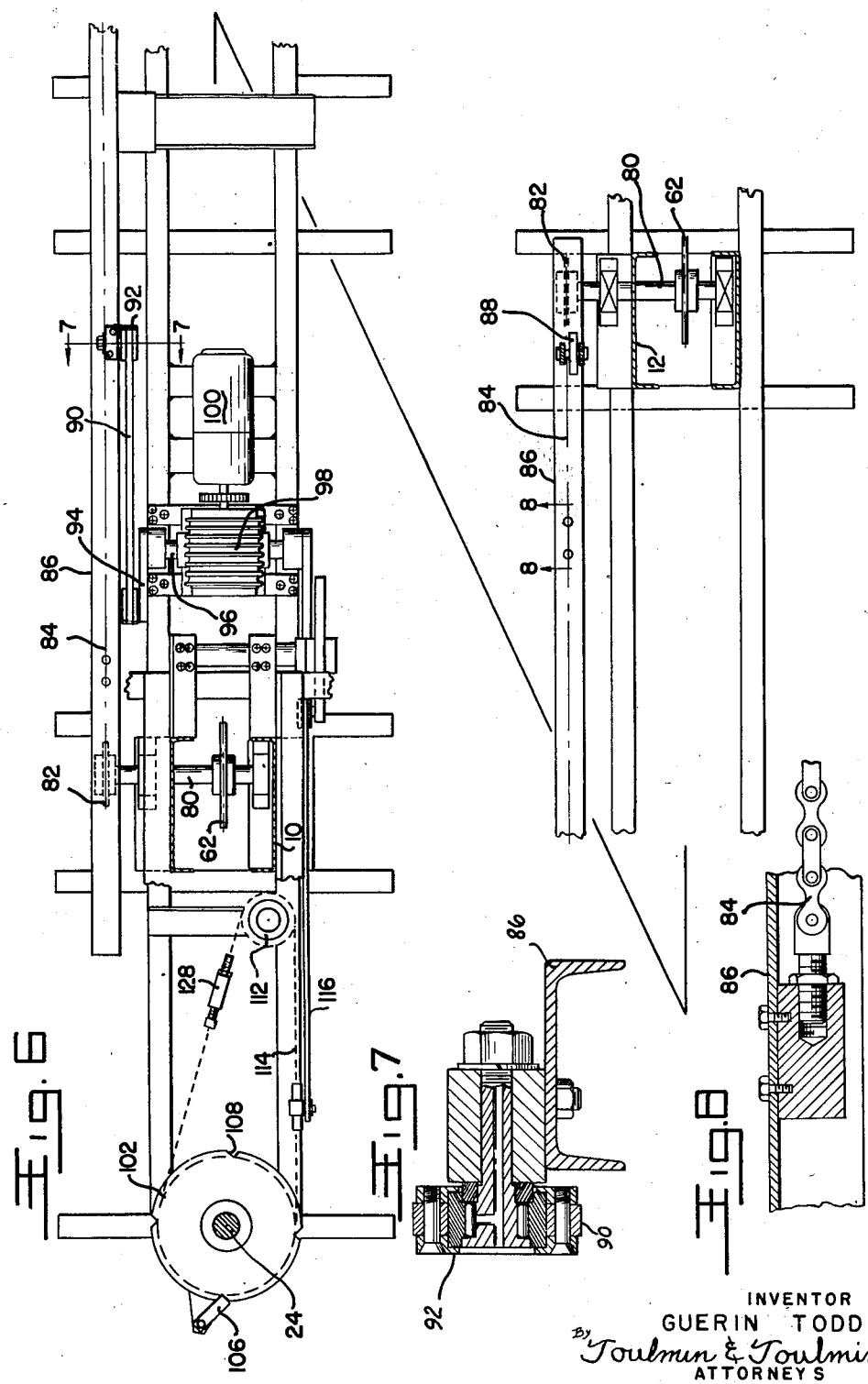

Oct. 6, 1953 G. TODD 2,654,462
CONVEYER DRIVE MECHANISM
Filed May 28, 1949 10 Sheets-Sheet 4
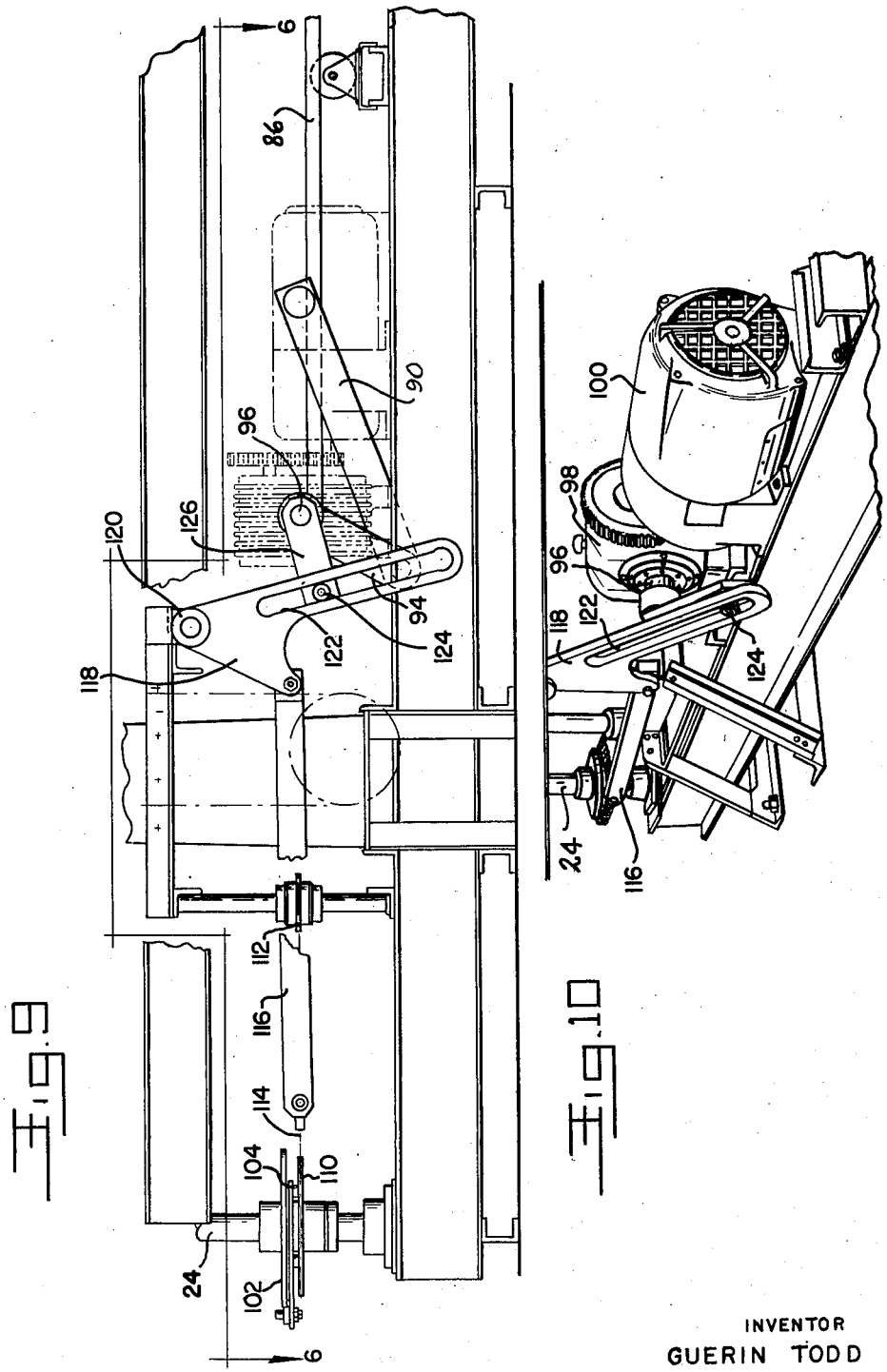
INVENTOR
GUERIN TODD
Toulmin & Toulmin
ATTORNEYS

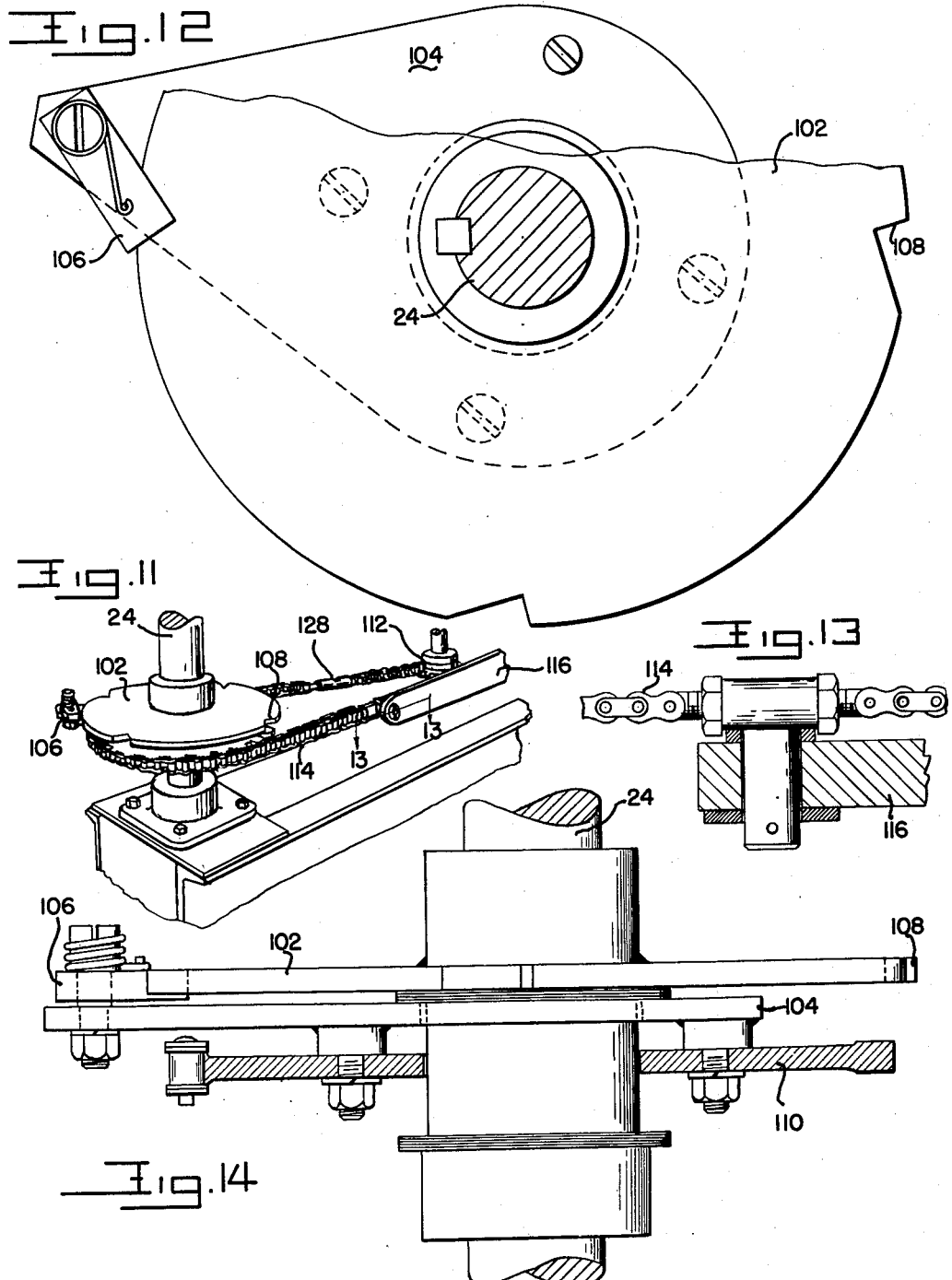

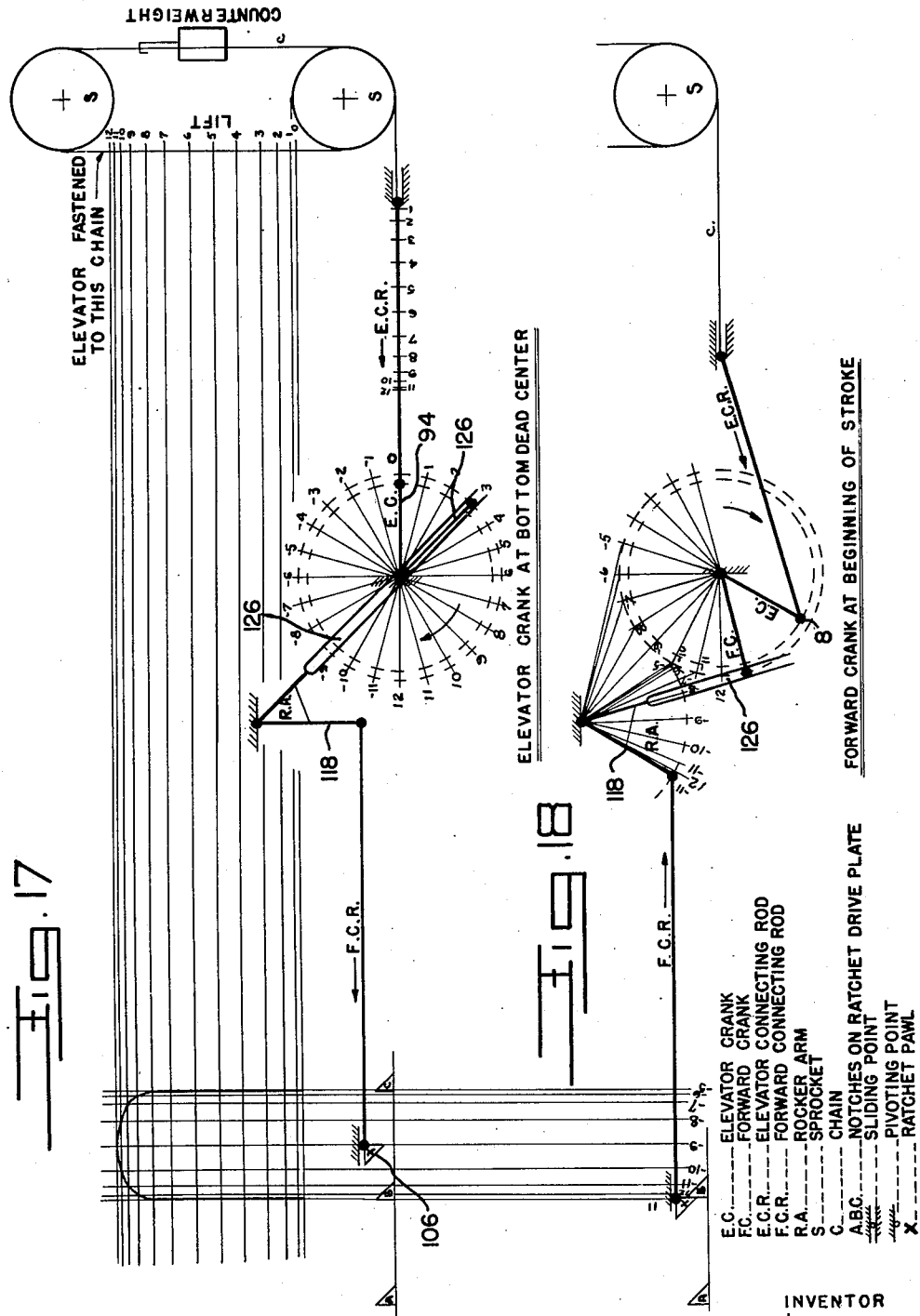

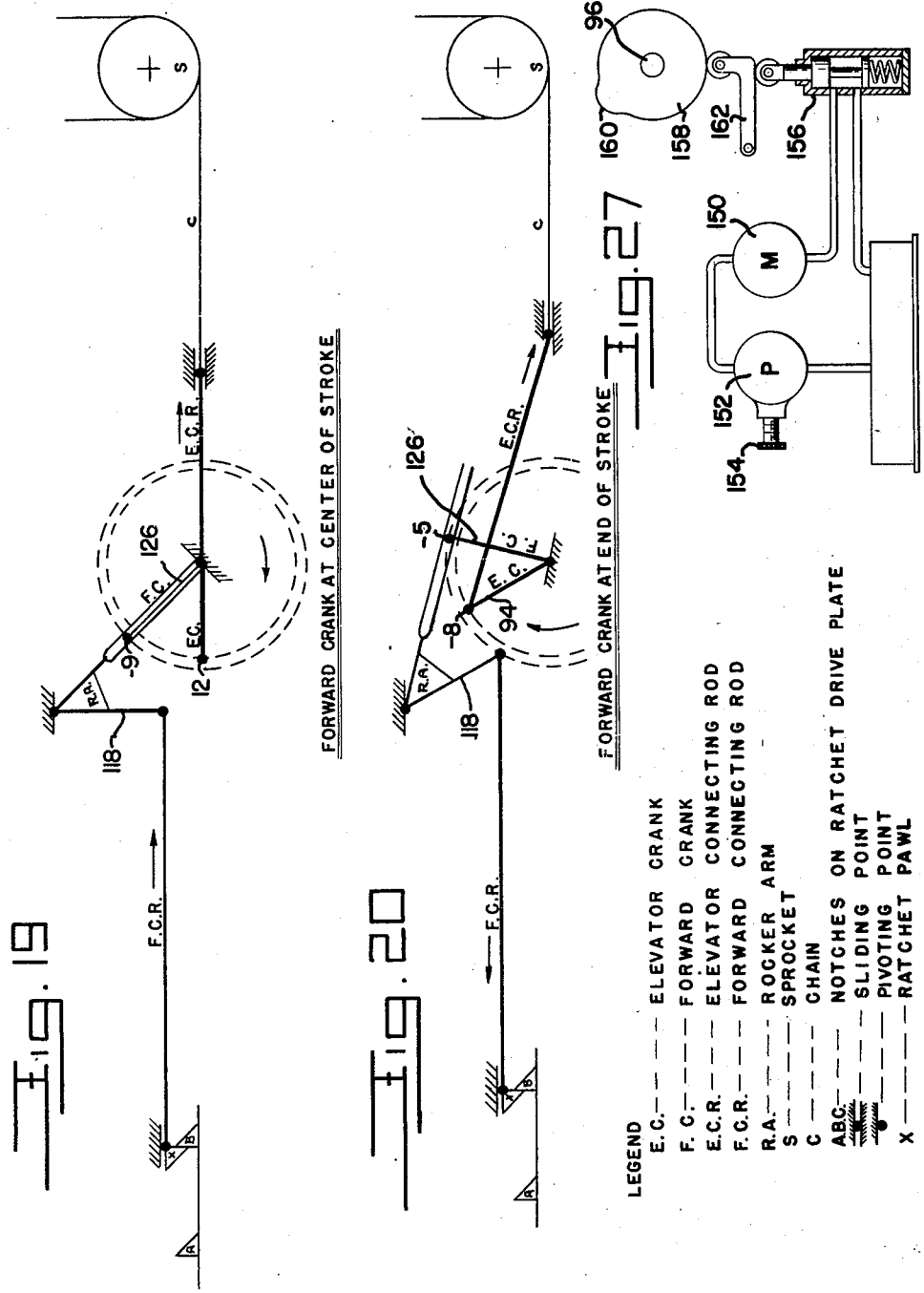

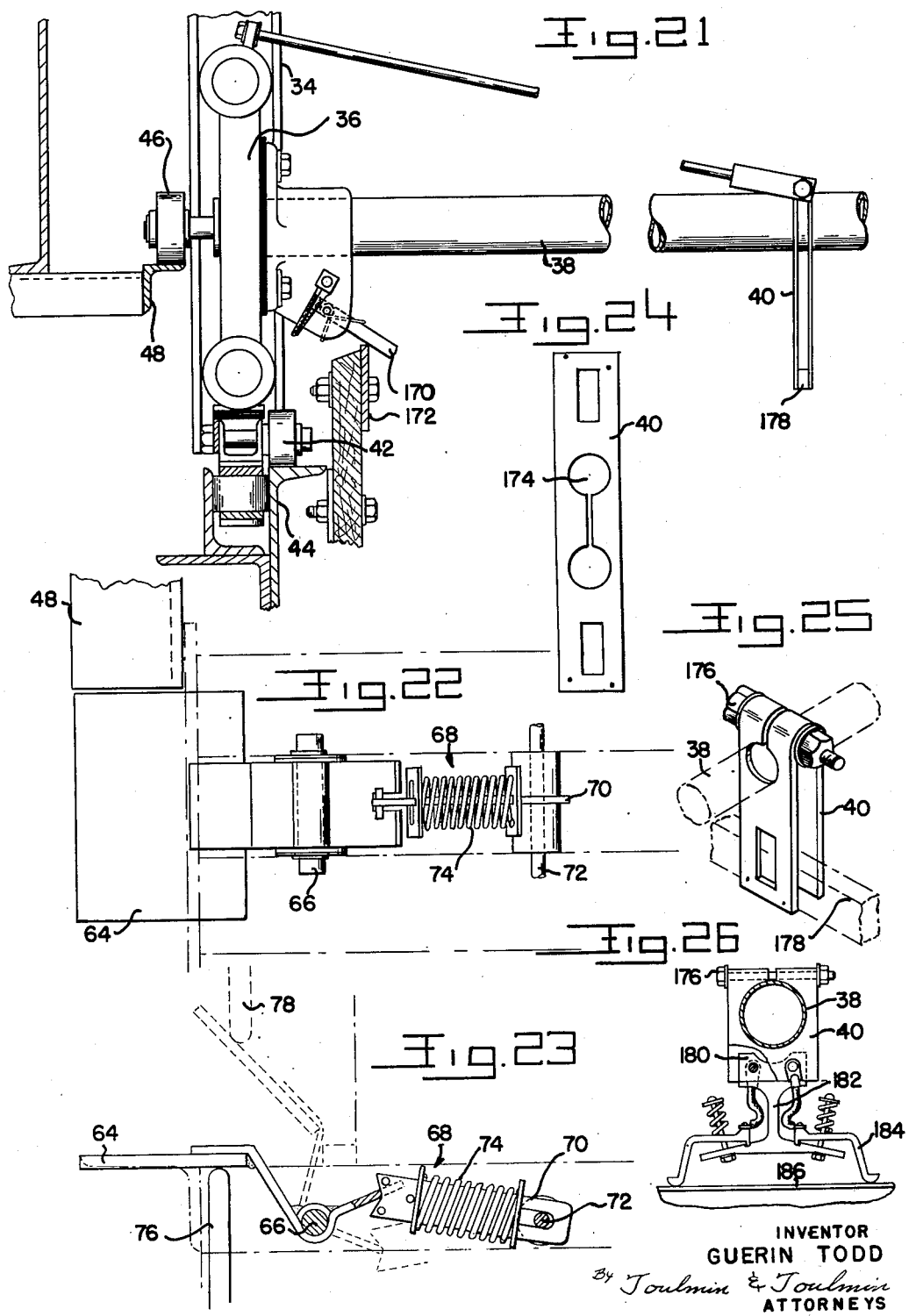

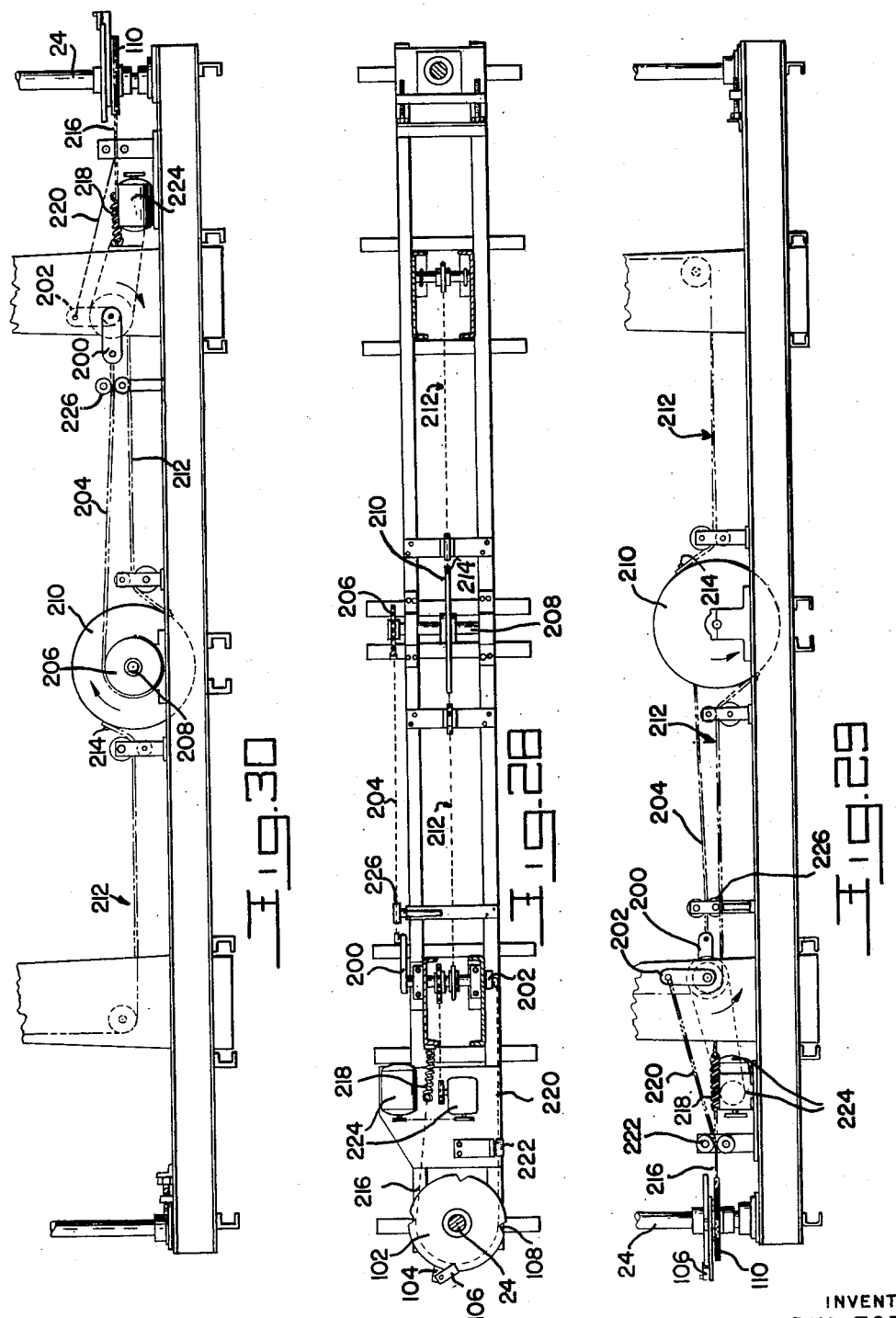

UNITED STATES PATENT OFFICE 2,654,462

CONVEYER DRIVE MECHANISM

Guerin Todd, Matawan, N. J., assignor to Hanson-Van Winkle Munning Company, Matawan, N. J., a corporation of New Jersey Application May 28, 1949, Serial No. 95,994

12 Claims. (Cl. 198—19)

This application relates to processing apparatus, particularly to automatic processing apparatus, adapted for conveying work pieces through a plurality of different baths for a complete work cycle.

Many industries and different work cycles find use for automatic processing machinery. Among other operations in which automatic processing machinery can be used are the testing of oven or refrigerator thermostats by dipping the bulb in a plurality of solutions at known temperatures and recording the results on instruments mounted for movement with the bulbs, heat treating cycles, testing cycles, as for example the testing for leaks in refrigerator evaporators or similar enclosures which are submerged in liquid in a glass-walled tank or the like, degreasing operations, cleaning operations, etching, various coating processes, and electro-processing cycles, such as electroplating.

It is in connection with the electro-processing art that machines of this type find their widest use, and for this reason, the present invention has been illustrated and described in connection with an electroplating machine. It is not intended, however, that this invention will be limited to this type of machine or circumscribed in any way by disclosing it in connection with this particular type of process.

In general an automatic processing machine comprises a frame, a plurality of conveyor arms mounted about the frame, conveyor means for moving the arms about the frame to convey them along a line of tanks which may either be arranged in a row or in a closed circuitous path, and elevator means for periodically lifting the carrier arms so that they will clear the partitions between adjacent tanks. This general type of apparatus is well-known in the industry, and in one arrangement the conveyor means takes the form of a pair of vertically spaced chains supported at their ends on sprockets mounted on vertical shafts. Extending between these chains at a plurality of points therealong, are vertically arranged guide members. The carrier arms are slidably mounted in the guide members, and when resting at the bottom thereof, the work pieces on the carrier arms are submerged in the treating solutions, and when the carrier arms are raised to the tops of the vertical guides, the work pieces are in position to be conveyed over the partitions between the tanks.

The elevator means in the machine comprises a structure vertically reciprocable on the machine frame and so arranged as to engage the carrier arms at the proper positions in their travel and to lift them so that they will clear the partitions between the tanks. It is in connection with this particular type of processing machine that this invention is shown and described.

Machines of the type described above are quite large, occupying a great deal of floor space and requiring considerable head room. Accordingly, any saving that can be made in the overall size of the machine and the head room required therefor is of benefit to the purchaser, not only in the space required for installing the machine, but with regard to the cost of the machine and its installation. The dimensions of the machine are also of vital consideration to the manufacturer, especially as regards the height of the machine because of the great difficulty of shipping the machines in a properly protected manner if the height exceeds a predetermined amount.

In recent years the sizes of work pieces which are handled by automatic processing machinery have been increased. At the present time large engine parts, aircraft parts, such as wing sections and cowlings, and other work pieces of similar size are being treated by automatic processing machinery. It will be evident that work pieces of this nature require deep tanks and high lifts of the carrier arms in order to clear the partitions between the tanks when the work pieces are conveyed therealong. In order to keep a machine of this nature as small as possible, it is desirable that the carrier arms lift from the tanks and set down into the tanks on as steep a path as possible, and that their path while being conveyed from one tank to another be as flat as possible.

The primary object of the present invention is to provide an improved drive for the elevating means and conveying means of an automatic processing machine such that the lift pattern of the carrier arms is steep on both sides and relatively flat across the top.

It is an object of this invention to provide elevator and conveyor drive means for automatic processing machinery such that the overall size of the processing machine is kept as small as possible.

A still further object of this invention is to provide an improved arrangement for actuating the elevator and the conveyor of a processing machine which is relatively inexpensive to construct and which is efficient in operation.

A still further object of this invention is to provide a drive means for an elevator and conveyor of a processing machine in which it is impossible to get the elevator and conveyor out of step and in which they are always positively synchronizing in operation.

A still further object of this invention is to provide an elevator and conveyor drive mechanism which is adaptable for any size machine and which can be extended to operate these elements of a very long processing machine, if desired, and without changing any of the basic drive elements.

In large processing machinery of this type it has been the practice to form most of the current conducting elements of heavy cast bronze or brass. The casting of these elements results in a very satisfactory work piece both as to strength and current conducting capacity, but detracts from the flexibility of the machine in that different castings must be made for machines which are to handle different types of work pieces. It is accordingly, still another object of this invention to provide an improved element for automatic processing machines and the like which is adapted for supporting the work piece carriers and which is so made that it can readily be adjusted as to size to accommodate different types of work pieces and without entailing the making of a plurality of different patterns as had been necessary heretofore.

It is also desirable in connection with automatic processes having a plurality of individual baths through which the work pieces are carried to minimize the amount of solution carried over from one tank to another, and it is a still further object of this arrangement whereby the work pieces are adequately drained of solution from one tank before being conveyed over and set down into the next tank.

It is also an object of this invention to provide an arrangement wherein the speed of the drive to the elevator and conveyor of a processing machine can be regulated during the whole, or any part, of the cycle of the machine.

These and other objects and advantages will become more apparent upon reference to the following description taken in connection with the accompanying drawings in which:

Figure 1 is a diagrammatic plan view showing one type of work cycle adapted for being carried out by a processing machine of the type with which this invention is concerned. It will be understood that the work cycle represented in Figure 1 is not necessarily typical or representative but merely shows one cycle which can be advantageously carried out by an automatic processing machine.

Figure 2 is a plan view looking down over the physical embodiment of a machine arranged to carry out the process illustrated in Figure 1;

Figure 3 is a side elevation of the machine shown in Figure 2 and with a portion of the machine broken away in order better to reveal the structure thereof;

Figure 4 is an end view of the machine looking in at the left from Figure 3 and shows still other constructional details in connection with the machine;

Figure 5 is a somewhat enlarged fragmentary view and may be considered as a section on the line 5—5 of Figure 3. This view illustrates the end of the elevator arrangement and the manner in which the elevator channels at the opposite sides of the machine are tied together and connected with the elevator actuating chains;

Figure 6 is a plan view and is indicated by the line 6—6 on Figures 3 and 4. Figure 6 shows the elevator and conveyor drive arrangement according to this invention;

Figure 7 is a vertical section indicated by the section line 7—7 on Figure 6 and shows the connection between the elevator drive mechanism and the power driven crank arm which actuates it;

Figure 8 is a vertical section indicated by the line 8—8 on Figure 6 and shows the connection of one part of the elevator drive mechanism with another part thereof;

Figure 9 is a side view showing the crank arms for driving the conveyor and elevator and also showing the conveyor drive end of the machine;

Figure 10 is a perspective view showing the drive for the conveyor of the machine;

Figure 11 is a view similar to Figure 10 but taken from another angle;

Figure 12 is a plan view looking down on the drive ratchet for the conveyor of the machine;

Figure 13 is a section indicated by the line 13—13 on Figure 11 and showing the connection between the drive pitman for the conveyor and the ratchet driving chain;

Figure 14 is a side view of the conveyor drive ratchet;

Figures 17 through 20 are diagrammatic views illustrating the action of the elevator and conveyor and the orientation of the driving cranks;

Figure 21 is a side elevation of one of the work piece carrier arms;

Figure 22 is a plan view of a flipper or shifter plate carried on the elevator;

Figure 23 is a side view of said flipper or shifter plate;

Figure 24 is a view of a blanked out bar adapted for being formed into a hanger support for the carrier arm;

Figure 25 is a perspective view of the blanked out bar of Figure 24 after it has been bent to shape;

Figure 26 is a view showing the hanger of Figure 25 being utilized in connection with a current collector;

Figure 27 is a view showing the hydraulic motor drive for the conveyor and elevator;

Figure 28 is a plan view of a modified arrangement of the elevator and conveyor drive of this invention; and Figures 29 and 30 are side views of the arrangement shown in Figure 28 taken from respectively opposite sides thereof.

Figure 15:
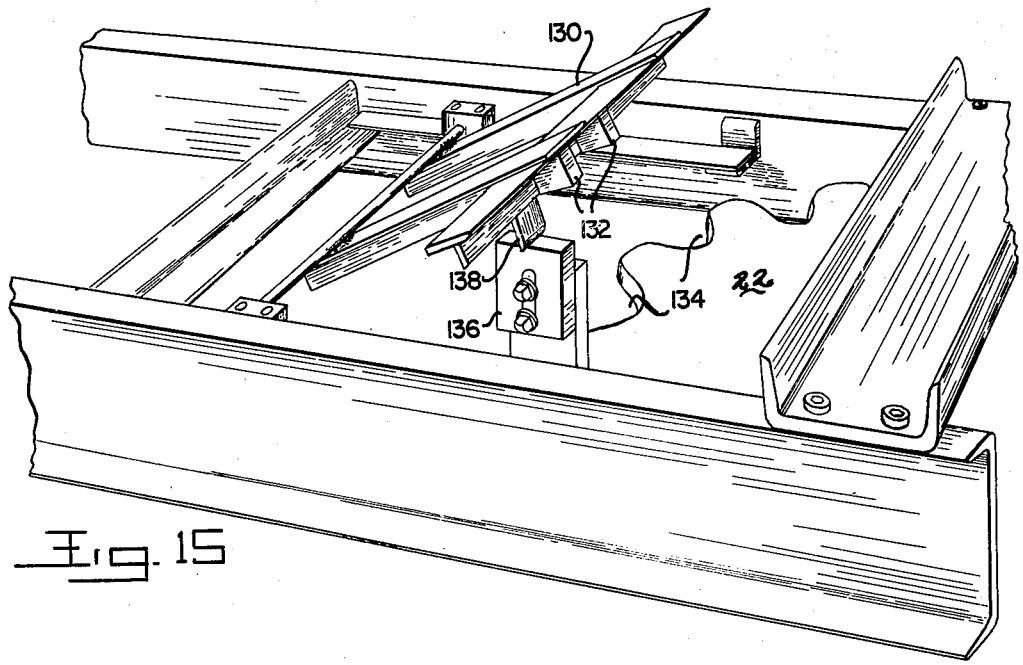
Figure 15 is a perspective view taken at one end of the machine at the top thereof and showing the interlock which holds the conveyor stationary while it is not being driven.

Referring to the drawings somewhat more in detail, Figure 1 diagrammatically illustrates one type of process for being carried out by the machine of this invention. In Figure 1 the conveyor is moving in a counterclockwise direction, and after the work pieces are placed on the work piece arms supported on the carrier arms and the said carrier arms are moved to the position marked "Load," the elevator lifts the carrier arms and then conveys them rightwardly to the point marked "Set down point" at the end of the cleaner tank. The carrier arms are then conveyed through the cleaner tank without any lifting movement until they reach the end of the cleaner tank. The elevator again lifts the arms at this point and the conveyor conveys them to the set down point at the right end of the etch tank.

The carrier arms then move through the etch tank without lifting until they reach the lift point at the left end of this tank. The lifting and conveying process is then repeated to set the carrier arms down into the pickle tank. At the left end of the pickle tank the arms are again lifted and conveyed over to the end of the plating tank and are set down therein.

The arms then move through the plating tank until they reach the right end, at which point they are again lifted and moved over the rinse tank. At the rinse tank the arms are lowered by the elevator and then, when the elevator moves up, they are again lifted and moved over to the set down point which is marked "Unload." This completes a cycle and the arms then have the work pieces unloaded therefrom and new work pieces placed thereon.

Figures 2, 3 and 4 illustrate the physical embodiment of one form of processing machinery adapted for carrying out a cycle such as is illustrated in Figure 1. The machine comprises a pair of spaced columns 10 and 12 which may be formed of the channel members, as will be seen in Figures 2 and 4. The lower ends of these channel members are connected by the longitudinally extending channel member 14 and are rigid at their upper ends with similarly longitudinally extending channels 16. The upper and lower channel members are interconnected by suitable tie members, as indicated at 18, and this comprises the main frame of the machine.

Mounted on the frame is a conveyor consisting of the upper and lower endless chains 20 which pass around a pair of sprockets 22 at the left end of the machine which are mounted on a shaft 24, and around a similar pair of sprockets 26 at the right end of the machine mounted on a shaft 28. The upper of the chains 20 is received in longitudinally extending channels 30, as will be seen in Figure 4, whereas the lower of the chains is received in corresponding channels 32. Spaced along the conveyor chains and extending vertically therebetween are a plurality of guides 34, each of which comprises a pair of spaced channels opening toward each other. Receivable within the channels is a block 36 with rollers thereon engaging the channels so the block is freely movable vertically within the guides. The blocks 36 carry the outwardly extending work piece carrier arms 38, as is best seen in Figure 4, and from which depend work pieces as by means of the hangers 40.

The construction of a carrier arm and the supporting block therefor is best illustrated in Figure 21, and it will be seen therein that when the carrier arm is in its down position, there is a roller 42 that rides on the top of the stationary frame member 44 for supporting the said arm. Extending rearwardly from the block 36 is a shaft supporting another roller 46, and this roller is adapted for engagement by an angle 48 on the elevator mechanism to be described hereinafter, for raising the block 36 and arm 38 vertically in its guide 34.

Turning now to the elevator construction, mounted on the frame and about the columns 10 and 12 is a vertically reciprocable structure comprising the longitudinally extending channel members 50 and 52 which are made rigid with each other by suitable cross ties, as indicated by the smaller channels at 54. Each of the columns 10 and 12 mounts therein a sprocket 56, and over these sprockets pass the chains 58. One end of each of the chains is secured to the elevator structure, as shown in Figure 5, and the other end passes over the associated sprocket 56 and has mounted thereon a counterweight 60 which substantially balances the elevator load.

The chains then extend downwardly and pass around the lower sprockets 62 in the columns 10 and 12, and then extend upwardly to be secured to the lower part of the elevator structure again, as illustrated in Figure 5.

Mounted along the sides of the elevator structure are the carrier arm lifting angles 48, so that when the conveyor moves the arms over the said angles, upward movement of the elevator structure will lift the said arms. It will be apparent that the angles 48 do not extend throughout the length of the elevator structure, but only from each lift point to the next adjacent set down point. Between each set down point and the next adjacent lift point, the elevator structure carries no lift angle so that the carrier arms remain in their down position for conveying work pieces through the treating solution.

It will also be apparent that the lift angle must be specially formed at the set down point for releasing the carrier arm from the elevator. This is preferably accomplished as shown in Figures 22 and 23, which illustrate the construction of a flipper or shifter plate 64. This plate is positioned on the elevator at the end of the lift angle 48 and with its upper surface in planar alignment therewith. The shifter plate, however, is pivoted as on the pin 66 and has associated therewith the toggle mechanism 68 which provides for snap action of the shifter plate into each of its up and down positions. The toggle mechanism comprises plate 70 slidable over a pin 72 and engaging the shifter plate at its rear edge. A spring 74 resists movement of the plate 70 rightwardly and thus provides for the desirable spring action on the shifter plate. Mounted in the machine to be engaged by the shifter plate after the work piece carrier arms have come to rest on the frame member 44 is the rod 76 which snaps the flipper into its up position so that as the elevator goes up, the plate will clear the roller 46 of the adjacent carrier arm and leave it in its down position. As the elevator approaches the uppermost part of its travel, another rod 78 engages the flipper plate and snaps it into its down position so that when the conveyor moves another arm along the elevator, the roller 46 thereof will ride onto the plate 64 and be supported thereby. This arrangement of flipper plate and rods is provided at each set-down point about the machine.

Turning now to the drive for the elevator, Figure 6 will reveal that each of the lower sprockets 62 is mounted on a shaft 80 journaled in the associated column and extending out one side thereof to mount a drive sprocket 82. Passing around the sprockets 82 is a drive chain 84 which along its upper reach is bolted to a channel 86, which serves as a stiffener to hold the upper reach of the chain rigid, as will be seen in Figures 6 and 8. Adjacent one of the sprockets 82 the channel 86 is held down by a roller 88.

Between the ends of the channel 86 there is connected a pitman or drag link 90 as by the bracket 92, as shown in Figure 7. The other end of this pitman or drag link is connected with a rotary crank arm 94 carried on a drive shaft 96 extending outwardly from the right angle drive 98 which is driven by the drive motor 100. It will be apparent that as the shaft 96 rotates, the arm 94 will rotate, and this will cause the pitman 90 to reciprocate the channel 86. The channel 86 through its connection with the chain 84 will cause the sprockets 82 and their shafts 80 to rotate, first in one direction and then in the other. This will cause the elevator structure to periodically raise and lower.

Heretofore, most elevator mechanisms on the machines of the type described in this application have had crank arms mounted in the base of the machine and connecting rods extending upwardly therefrom to the elevator structure, so that lifting of the elevator was accomplished by pushing upwardly on the connecting rods. It will be evident that the first 90 degrees of rotation of the cranks in an installation of this nature will result in considerably less than one-half of the total elevator lift, due to the effective shortening of the connecting rod as it tilts relative to the vertical. The machines ordinarily do not have sufficient space for utilizing a longer connecting rod which would tend to offset this disadvantage, and, accordingly, it is difficult to obtain a steep lift pattern such as is obtained by the mechanism of this invention.

Referring briefly to the corresponding structure shown in the drawings in this application, it will be noted in Figures 17 through 20 that the lifting motion of the elevator takes place by the crank pulling on the connecting rod so that the effective shortening of the connecting rod as it tilts following the crank adds to the movement of the crank and assists in producing the steep lift pattern. As a comparison, utilizing normal connecting rod length and crank throws, the amount of elevator lift produced by ninety degrees of travel of the crank according to the prior art arrangement described above, was about forty per cent of the total elevator lift, while with the arrangement shown in this application, the first ninety degrees of travel of the crank will result in about sixty per cent of the total elevator lift.

Turning now to the conveyor drive, the shaft 24 at the left end of the machine, as viewed in Figure 3, has mounted thereon adjacent its lower end, a ratchet plate 102 and rotatably mounted on the shaft beneath the ratchet plate is a pawl carrying plate 104 carrying the pawl member 106 for cooperation with the notches 108 in plate 102. The pawl carrying plate 104 is bolted to a sprocket 110 which is also freely rotatable on the shaft 24. Passing around the sprocket 110 and around an idler sprocket 112 is a chain 114 which is pivotally connected, as best seen in Figure 13, with the end of a pitman or drag link 116.

The drag link or pitman 116 is connected as shown in Figure 9, where it will be seen that the right end of this member is pivotally connected with a lever 118 journaled on the frame of the machine, as at 120. The lever 118 has a slot 122 therein that receives a roller 124 on the end of an arm 126 mounted on the opposite end of the shaft 96 from the arm 94. It will be apparent that the lever 118 and the arm 126 form a quick return (shaper) type mechanism such that the drag link 116 is driven in one direction during substantially less than half a revolution of arm 126, and is driven in the other direction during the remainder of the revolution of the said arm. The chain 114 may be kept tight by means of an adjustable link therein as will be seen at 128 in Figure 11.

As mentioned before, it is desirable in a machine of the type described to obtain a transfer pattern for the carrier arms as steep as possible during the lifting and lowering of the arms and as flat as possible during the conveying of the arms. The conveyor and elevator drive mechanism described above accomplishes this object as will be seen upon reference to Figures 17 through 20.

In these figures, the positions of the elevator crank arm 94 have been numbered from zero through 12, zero being the lowermost position of the elevator, and 12 being its uppermost position, and from 12 through the minus numbers back to zero, the negatively numbered path indicating downward movement of the elevator.

In Figure 17 the elevator crank is shown with the elevator in its down position. The conveyor drive crank arm 126 is at this time moving the lever 118 clockwise, and thus carrying the pawl 106 around the periphery of the ratchet wheel in a clockwise or idle direction.

Figure 18 shows the arrangement as the conveyor crank begins its working movement. It will be noted that at this time the elevator crank has reached position 8 so that the elevator is near its uppermost position. The elevator has, in fact, completed four-fifths of its upward travel, as will be seen on reference to Figure 17.

In Figure 19 cranks are shown with the elevator crank 94 at position 12, indicating that the elevator is in its extreme uppermost position. It will be noted that the conveyor crank arm 126 is at this time half way through its working stroke and is at position —9.

In Figure 20 the conveyor crank arm 126 is at position —5 and has completed its work stroke. Further movement of conveyor crank 126 will merely return the lever 118 and pawl 106 to a new driving position. In the position shown in Figure 20, the elevator crank arm 94 has reached position —8 so that the elevator has completed only one-fifth of its downward travel. It will be apparent that all of the conveyor movement takes place during the time the elevator occupies the upper fifth part of its travel. The transfer pattern for the carrier arms is thus vertical on both sides and relatively flat across the top. The actual pattern obtained is indicated at the left end of Figure 17. It will be apparent that the exact shape of this transfer pattern could be modified to some extent by adjusting the pivot of lever 118 relative to the center of drive shaft 96, and by making similar changes in the structure.

It will also be evident that a transfer pattern, as shown in Figure 17, permits a minimum length of machine because the smallest amount of clearance is necessary between the work piece carriers and the ends of the tank and that the overall height of the machine is kept in at a minimum because there is substantially no waste movement of the elevator and conveyor in order to clear the partitions between the tanks.

Figure 16:
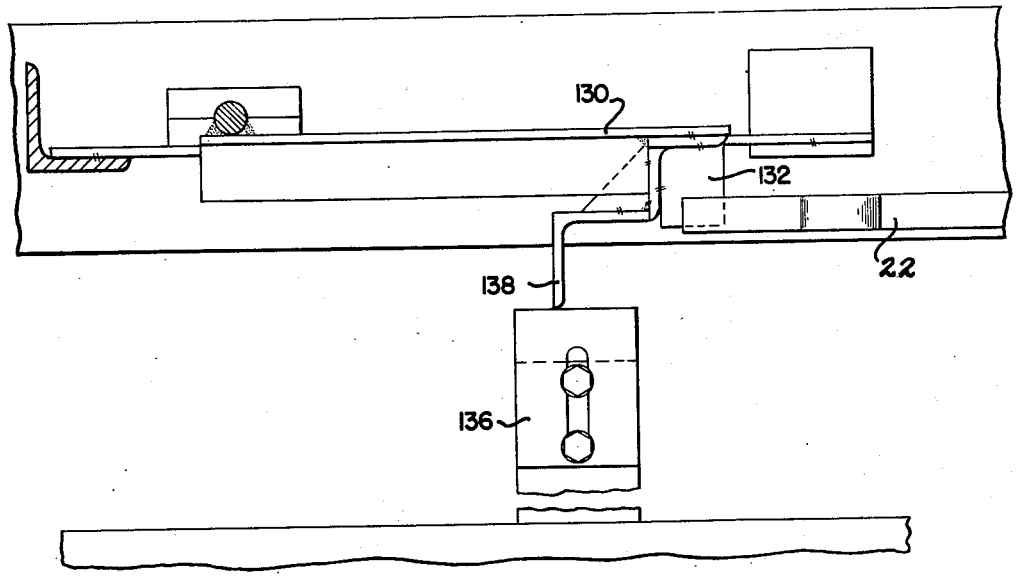
Figure 16 is a side view of the interlock mechanism.

It is preferable to maintain the elevator and conveyor in exact synchronism in order to insure that the carrier arms will always occupy exactly the same positions when the elevator lifts and lowers them. According to this invention, this is accomplished by providing a pivoted latch member 130 having a pair of teeth 132 thereon adapted for dropping into a pair of roller spaces 134 on one of the upper sprockets of the conveyor chains 20. Inasmuch as the elevator is near the top of its stroke before the conveyor is actuated, the said elevator may carry an adjustable abutment 136 adapted for engagement with an abutment 138 on the pivoted plate 130 so as to lift the said plate from its locking position illustrated in Figure 16 to its unlocking position illustrated in Figure 15. The provision of this interlock prevents the elevator and conveyor from ever getting out of step.

As mentioned previously, it is desirable to keep the amount of carry-over from one solution to another at a minimum. For this purpose the drive motor arrangement shown in Figure 27 may be employed. In this view the drive motor is a hydraulic motor 150 which is supplied with actuating fluid from a pump 152. The pump 152 may be adjustable in capacity as by the adjustable member 154 to regulate the speed of the motor 150 and there may additionally be provided a restrictor valve 156 in the discharge line from the motor which is adapted for being adjusted by a cam 158 on shaft 96. As shaft 96 rotates and the elevator commences its upward movement the raised part 160 of cam 158 acts on lever 162 to increase the restriction of valve 156. This slows the motor 150 down and gives the work pieces being lifted from the solutions ample time to drain. After the lever 162 rides off the raised part 160, the machine, of course, resumes its full speed of movement. It will be apparent that many other similar arrangements could be employed for regulating the speed of operation of the drive mechanism. For example, the cam 158 could operate directly on the pump displacement control member 154 and equivalent results would obtain. Similarly, other types of valves could be employed in connection with controlling the fluid flow through the motor 150.

Associated with the carrier arm 38, as shown in Figure 21, are current collector fingers 170 which bear on a conducting rail 172 when the arms are in their down position. Similarly, the arms carry the hanger members 40 to which are connected the work pieces or other hangers for the work pieces. The members 40, the radially projecting arms of the carriers and the fingers must all be electrically conductive. Heretofore it has been customary to form these members of relatively heavy cast sections. According to this invention, a greatly simplified arrangement has been devised which results in more inexpensive construction, which is more easily fabricated, and which can be adjusted readily to accommodate different types of work pieces and work piece hangers.

Figures 24, 25 and 26 illustrate this phase of my invention. In Figure 24 there is illustrated a bar which is blanked out from copper or some other suitable ductile highly conductive material. In the center of the bar is a dumbbell shaped aperture 174. After blanking, the bar is bent to the shape shown in Figure 25, and it will be seen that the dumbbell shaped aperture forms an opening for receiving the outwardly extending arm of the work piece carrier. The slot connecting the enlarged end parts of the aperture 174 permits clamping of the bent-up bar on the arm as by the bolt 176, thereby to insure a rigid connection between the members and one which has good current carrying qualities. The downward extending end parts of the two sides of the bar receive between them the hanger bar 178.

In Figure 26, the bar is shown adapted for a current collector. In this figure the lower ends of the bar receive between them, as at 180, the upper end of a bracket 182 which resiliently supports a plurality of fingers 184 which ride on the top of a rail 186 when the carrier arm is in its down position. It will be evident that the improved construction which I have provided in connection with the bar shown in Figure 24 is highly useful both for supporting work piece hangers and for connecting contact fingers with the carrier arm.

The machine which has been described above is a processing machine of a rather general type and is adapted for handling any type of work piece including the largest and heaviest thereof. In many instances such as in the jewelry art and allied trades, a much smaller and lighter machine can be used. In connection with such lighter types of machines, I have embodied my improved conveyor and elevator drive in the form illustrated in Figures 28 through 30. Referring to these figures, the two crank arms which drive the elevator and conveyor drives are shown at 200 and 202, respectively. The elevator drive crank 200 is connected by a chain 204 with a drive sprocket 206 carried on a shaft 208 that mounts in the center of the machine frame a large sprocket 210. The sprocket 210 in turn receives the ends of the elevator lift chains 212. It will be noted that the chains 212 each pass part-way around the sprocket 210 and are rigidly connected therewith at their ends, as at 214. It will be evident that rotation of the crank 200 will cause reciprocation of the chain 204 to turn the sprocket 206, shaft 208 and sprocket 210, first in one direction, and then in the other. This, in turn, will cause reciprocation of the chains 212 and alternately raise and lower the elevator. The amount of rotation imparted to the sprocket 210 is somewhat less than one-half revolution in each direction, so that chains 212 never ride on top of each other, and a single sprocket member suffices for driving both the said chains.

In other instances, when it is necessary for sprocket 210 to rotate more than one-half revolution, two of the said sprockets may be employed so the chains 212 never have any opportunity for riding over one another.

The conveyor drive crank 202 is connected with the pawl supporting plate 104 by means of a first chain 216 that passes around the sprocket connected with the pawl supporting plate to a spring 218 at one end and to a second chain 220 at the other end and which, in turn, is connected with the end of the crank 202. It is necessary to provide two chains 216 and 220 because one thereof is flexible in the horizontal plane for passing about the drive sprocket 118, and the other thereof is flexible in the vertical plane for passing between the guide rollers 222.

A drive motor and speed reducing unit at 224 is connected for driving the shaft which supports the crank arms 200 and 202.

It will be noted, especially in Figures 28 and 29, that the guide rollers 222 for the conveyor drive chain 220 are substantially farther from the crank arm 202 than the guide rollers 226 for the elevator drive chain 204 are from the crank arm 200. Because of this, the movement of the conveyor is substantially harmonic, whereas a movement of the elevator is substantially different from harmonic. The elevator rises rapidly, remains elevated with substantially little movement during considerable amount of movement of its crank arm, and then sets down rapidly. It will be noted that the orientation of the crank arms 200 and 202 is such that all of the conveyor movement takes place while the elevator is adjacent its uppermost position. It will be understood that an interlock similar to that shown in Figures 15 and 16 could be employed in connection with the embodiment shown in connection with Figures 28 through 30. Likewise, the drive arrangement illustrated in Figure 27 could be embodied, if desired, for reducing the carry-over of solution from one tank to another.

It will be evident that a quick return drive such as is shown for the conveyor mechanism in Figures 9 and 10 could be employed for the conveyor of the arrangement shown in Figures 28 through 30, if desired. However, since this machine is designed for carrying very light racks of work pieces, there may be some tendency for these racks to whip outwardly in passing around the ends of the machine at high speed. For this reason it is usually preferable to employ the crank and chain drive arrangement shown, rather than the quick return type drive.

From the foregoing description it will be evident that I have provided an improved elevator and conveyor driving mechanism for a processing machine which results in a transfer pattern for the carrier arms which is steep on the sides and relatively flat on the top. The drive is relatively simple to construct, and is, therefore, inexpensive, light, and easily maintained. It will be apparent that, due to the drag link connection of the driving arms with the elevator and conveyor drives, the drive mechanism according to this invention could be mounted on a processing machine of any size and as many lifting connections could be made to the elevator as was necessary properly to operate it. This invention also provides for keeping the elevator and conveyor drives synchronized, so that it is impossible for the machine operator to get the conveyor chain out of its proper position relative to the elevator, as has sometimes occurred with arrangements of the prior art by the operator's shifting the conveyor chains to untangle work piece hangers from obstructions.

This invention has also provided an improved arrangement for supplying motive power to the elevator and conveyor drive such that the speed of operation of these drives can be regulated during any part of the operating cycle. The improved supporting brackets also provided by this invention contribute materially to the operating efficiency of the machine and to its economical construction because they are lighter, more inexpensive and more easily fabricated than the corresponding cast members employed heretofore.

It will be understood that this invention is susceptible to modification in order to adapt it to different usages and conditions, and, accordingly, it is desired to comprehend such modifications within this invention as may fall within the scope of the appended claims.

I claim:

1. In a processing machine having a frame with spaced upstanding columns; a vertical shaft in each end of the frame and sprocket means thereon, conveyor chain means passing around said sprocket means and carrier arms on the conveyor, a ratchet drive on one of said shafts for driving said conveyor; an elevator mounted about and extending between the said columns, a pair of vertically spaced sprockets rotatable on horizontal axes in each of said columns and an elevator chain passing over the spaced sprockets and connected to the elevator, a drive sprocket connected with one each of said pairs of spaced sprockets, and a drive chain passing therearound; a drive shaft and first and second crank arms mounted thereon, a drag link connecting said first arm with the upper reach of said drive chain, a stiffener member connected to said drive chain along with said upper reach thereof, and a quick return mechanism connecting the second arm with said ratchet drive so the conveyor is driven by said second arm during substantially less than half a revolution thereof, said arms being so arranged on said drive shaft that the elevator is in its extreme uppermost position when the conveyor has completed exactly one half of its movement.

2. In a processing machine; a frame, conveyor means on said frame for conveying work piece supporting arms therealong, elevator means on said frame separate from said conveyor means for elevating said arms, drive means for said conveyor and elevator means so interconnected that the first and last parts of the travel of the elevator means takes place in the absence of movement of said conveyor means, and all of the movement of the conveyor means takes place while the elevator means is adjacent its uppermost position, a drive motor for said drive means, and means operated by said elevator for slowing down the speed of said motor during the initial part of the lifting movement of said elevator.

3. In a processing machine; a frame, conveyor means on said frame for conveying work piece supporting arms therealong, elevator means on said frame for elevating said arms, drive means for said conveyor and elevator means so interconnected that the first and last parts of the travel of the elevator means takes place in the absence of movement of said conveyor means, and all of the movement of the conveyor means takes place while the elevator means is adjacent its uppermost position, a hydraulic drive motor for said drive means, means responsive to the initiation of the lifting movement of said elevator for slowing down said drive motor, and means responsive to a predetermined amount of lift of said elevator for again speeding up said motor.

4. In a processing machine having a frame with a conveyor and an elevator on said frame for respectively conveying and elevating work piece supporting arms; a drive shaft and a pair of crank arms drivingly connected therewith, one of said arms being connected with said elevator so that as the said arm rotates the elevator moves up and down, a reciprocable element connected with the other arm and ratchet means connecting the reciprocable element with the conveyor for driving the conveyor in one direction of movement of said element, said arms being so oriented that the whole of the conveyor movement takes place while the elevator is adjacent its uppermost position, a drive motor connected with said drive shaft, a cam driven by said shaft and means controlled by said cam for slowing down said motor during a portion of the lifting movement of said elevator.

5. In a processing machine; a frame, conveyor means on said frame for conveying workpiece supporting arms horizontally therealong, elevator means on said frame separate from said conveyor means engageable with said arms and vertically reciprocable for elevating said arms, intermittent drive means for said conveyor and continuous drive means for said elevator means so interconnected that movement of the elevator means over the lower part of the travel thereof takes place in the absence of movement of said conveyor means, and all of the movement of the conveyor means takes place while the elevator means is adjacent its uppermost position, a drive means for said drive means, and means operatively connecting the said drive means for the elevator with the elevator for slowing down the speed of movement of said elevator adjacent its uppermost position during travel of the elevator up and down.

6. In a processing machine; a frame, conveyor means on said frame for conveying the workpiece supporting arms horizontally therealong, elevator means on said frame engageable with said arms and vertically reciprocable for elevating said arms, drive means for driving said elevator continuously in up-and-down movements, an intermittent drive for said conveyor, a rotary crank arm, and variable speed means connecting said rotary crank arm with said drive means operable to drive said drive means at a varying rate of speed such that the elevator moves more slowly during the upper portion of its travel than during the lower portion of its travel, said intermittent drive for said conveyor being driven synchronously with said crank arm and being operable for moving the conveyor while the elevator is adjacent the uppermost position thereof.

7. In a processing machine having a frame with spaced upstanding columns; a vertical shaft in each end of said frame and sprocket means thereon, conveyor chain means passing around said sprocket means and carrier arms on the conveyor chain means movable horizontally therewith and vertically thereon, a ratchet drive on one of said shafts for driving said conveyor chain means, an elevator in the frame engageable with the arms to raise them vertically on the conveyor chain means, sprocket means in each column and elevator chains passing thereover and connected to said elevator, drive chain means drivingly connected with said elevator chains, a drive shaft, first and second crank arms mounted on said drive shaft in fixed angular relation, a first reciprocable element connecting said first crank arm with said drive chain means and arranged to be in parallel contiguous relation with the first crank arm when the elevator is in its uppermost position whereby the slowest movement of the elevator obtains during the upper portion of its travel, and a second reciprocable element connecting the second crank arm with said ratchet drive so said conveyor is driven by said second crank arm during not more than one-half a revolution thereof, said arms being so oriented on the drive shaft that the elevator is in its extreme uppermost position when the conveyor chain means has completed one-half of its movement.

8. In a processing machine having a frame with a conveyor and elevator for respectively horizontally conveying and vertically elevating workpiece supporting arms; a first rotary crank arm for driving said elevator continuously in an up-and-down direction, a reciprocable element connected between said first crank arm and said elevator operable to drive the elevator at a slower rate during the upper portion of the elevator travel than during the lower portion thereof, a ratchet drive for the conveyor, a second reciprocable element connected at one end with the ratchet drive so the conveyor is driven in only one direction of movement of the said element, a second rotary crank arm connected in rigid angular relation with said first crank arm to rotate therewith, means connecting said second crank arm with said second reciprocable element for movement of said second reciprocable element so movement of the said reciprocable element in its said one direction takes place within less than the period required for said second crank arm to turn through one-half a revolution, said crank arm being so oriented angularly that the movement of said second reciprocable element in its said one direction takes place while the elevator is adjacent its uppermost position, and means for engaging and locking said conveyor in the foremost position to which it has been moved by said ratchet drive, said locking means being operated by said elevator into unlocking position as the elevator approaches its uppermost position and into locking position when said elevator retracts from its uppermost position.

9. In a processing machine having a frame with a conveyor and an elevator for respectively horizontally conveying and vertically elevating workpiece supporting arms; a first crank arm connected with the elevator rotatable for continuously reciprocating the elevator in the vertical direction, a ratchet drive for moving said conveyor and a reciprocable element connected at one end with said ratchet drive so the conveyor is driven in only one direction of movement of said element, a lever stationarily pivoted at one end and pivotally connected at its other end to the other end of said element, a second crank arm rigidly connected in angular relation with said first crank arm to rotate therewith, a slot in said lever and means on said second arm slidably working in said slot, said second arm being so located relative to the lever that said means is closest to the pivotal support of said lever when the lever is being driven to move said element in its said one direction so that said second arm makes substantially less than one-half revolution in driving said reciprocable element in its said one direction and substantially more than one-half revolution in driving said reciprocable element in the other direction, said crank arms being so angularly arranged that the movement of said reciprocable element in its said one direction takes place while the elevator is adjacent its uppermost position.

10. An arrangement as set forth in claim 7 in which the said reciprocable elements comprise flexible members.

11. An arrangement according to claim 10 in which guide rolls are provided for the flexible elements spaced from the said crank arms, and with the guide rolls for the said first reciprocable element being located substantially closer to the pertaining crank arm than the guide rolls for the second reciprocable element.

12. An arrangement according to claim 10 in which both the elevator and the said ratchet drive are biased so as to maintain the said reciprocable elements under tension at all times.

GUERIN TODD.

References Cited in the file of this patent

UNITED STATES PATENTS

| Number | Name | Date |
|---|---|---|
| 285,943 | Ames | Oct. 2, 1883 |
| 798,833 | Ruff | Sept. 5, 1905 |
| 2,145,399 | Llewellyn | Jan. 31, 1939 |
| 2,175,788 | Todd | Oct. 10, 1939 |
| 2,214,262 | Todd | Sept. 10, 1940 |
| 2,398,059 | Turner | Apr. 9, 1946 |

FOREIGN PATENTS

| Number | Country | Date |
|---|---|---|
| 729,019 | France | July 16, 1932 |